July 22, 1941. H. D. WHITE Re. 21,864

REFRIGERATOR CABINET

Original Filed Nov. 2, 1938

INVENTOR
HOWARD D. WHITE
BY W. A. Steiger
ATTORNEY

Reissued July 22, 1941 Re. 21,864

UNITED STATES PATENT OFFICE 21,864

REFRIGERATOR CABINET

Howard D. White, Adrian, Mich., assignor to Westinghouse Electric & Manufacturing Company, East Pittsburgh, Pa., a corporation of Pennsylvania Original No. 2,212,964, dated August 27, 1940, Serial No. 238,364, November 2, 1938. Application for reissue May 20, 1941, Serial No. 394,368

2 Claims. (Cl. 220—9)

My invention relates to refrigerator cabinet construction and particularly to the construction and assembly of the breaker strips for closing the space between the inner and outer shells of a refrigerator cabinet.

It is an object of my invention to provide an improved breaker strip assembly wherein the use of screws, nails and like for fastening the breaker strip to the cabinet are dispensed with.

It is another object of my invention to provide a breaker strip assembly which effectively prevents the entrance of moisture and air into the heat insulation of the refrigerator cabinet.

It is still another object of my invention to provide an improved breaker strip construction from the standpoint of appearance and to insure that the breaker strip will not move or rattle in the normal use of the refrigerator.

It is a further object of my invention to provide improved breaker strips which are easily and quickly assembled to refrigerator cabinets.

It is also an object of my invention to provide improved breaker strip assemblies for refrigerator cabinets of the type wherein the breaker strip lies in the plane of the door opening.

These and other objects are effected by my invention as will be apparent from the following description and claims taken in accordance with the accompanying drawing forming a part of this application, in which:

Figure 1:
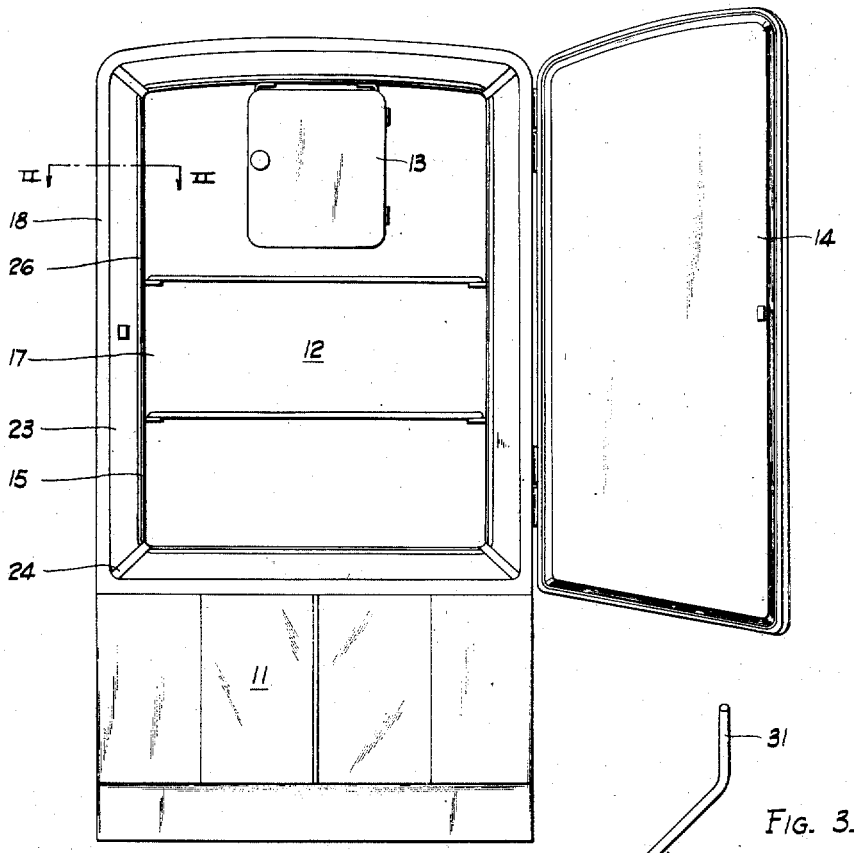
Fig. 1 is a front view of a refrigerator cabinet showing my improved breaker strip construction.

Referring specifically to the drawing for a detailed description of my invention, numeral 11 designates generally a refrigerator cabinet embodying a food compartment 12 containing an evaporator 13 and having a door 14 for closing a door opening 15. The cabinet 11 is formed by an outer shell 16 and an inner shell or food liner 17 with heat insulation disposed between the inner and outer shells. The food liner 17 is supported within the outer shell 16 in any suitable manner (not shown).

Figure 2:
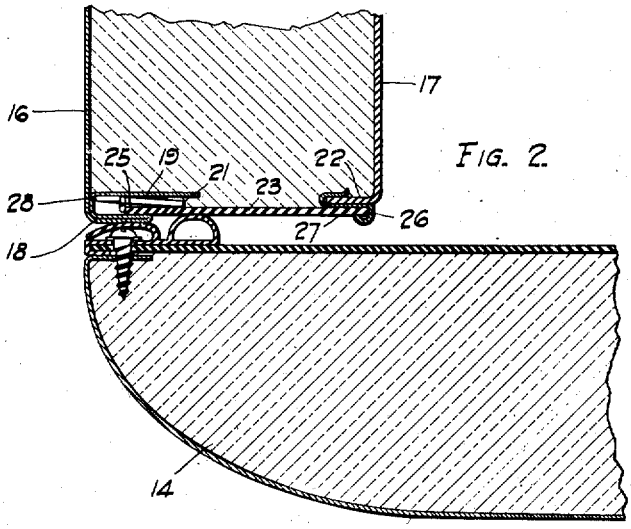
Fig. 2 is a partial sectional view on line II—II of Fig. 1 with the cabinet door in its closed position.

The outer shell 16, as shown in Fig. 2 is bent at right angles peripherally of the door opening 15 to form a flange 18 in the plane of the front of the cabinet 11. The outer shell 16 is bent in a U-shape as shown at 19 to form a pocket 21 which extends completely around the door opening. The inner shell or food liner 17 is likewise bent at right angles peripherally of the door opening 15 to form a flange 22 in the plane of the front of the cabinet and extending toward the flange 18 on the outer shell. A breaker strip 23 connects the inner and outer shells 16 and 17 and is preferably formed of a material impregnated with a resinous condensate product, so that the breaker strip is non-metallic and non-hygroscopic. Preferably a flat strip 23 is provided at the top, bottom and each side of the door opening 15 and corner clips 24 cover the meeting edges of the four breaker strips.

The outer marginal edge 25 of the breaker strip 23 extends into the pocket 21 in the outer shell 16 as shown in Fig. 2. A strip of metal 26 bent to the cross section shown in Fig. 2 receives the inner marginal edge 27 of the breaker strip 23 and also receives the flange 22 on the inner shell 17 to retain one end of the breaker strip 23 in position.

Figure 3:
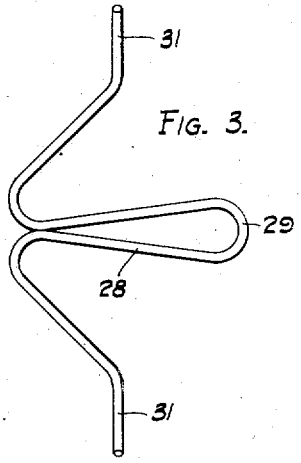
Figs. 3 and 4 are detail views of a metal spring preferably used in the breaker strip construction.
Figure 4:
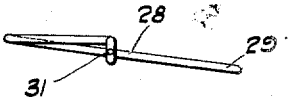

A plurality of metal springs 28 bent to the shape shown in Figs. 3 and 4 are disposed in the pocket 21 in the outer shell 16. A hairpin-shaped portion 29 of the spring 28 forces the breaker strip 23 transversely of its cross section against the inner face of the pocket 21, thus sealing the heat insulation from the infiltration of moisture and air. Outwardly extending wings 31 of the spring 28 force the breaker strip 23 longitudinally of its cross section and retain the edge 27 and the flange 22 of the inner shell 17 in engagement with the metal strip 26. It is thus apparent that the breaker strip 23 is held tightly in position and is disposed in the plane of the front surfaces of the cabinet 11.

The breaker strip 23 is preferably assembled on the cabinet in the following manner. The strip of metal 26 is first placed on the inner edge 27 of the breaker strip 23 and the springs 28 are disposed in the pocket 21. The outer marginal edge 25 of the breaker strip is then inserted in the pocket 21 and the springs 28 are compressed by forcing the breaker strip inwardly until the strip of metal 26 may be snapped in place on the flange 22. The four breaker strips 23 are assembled in this manner and the corner clips 24 are fastened to the cabinet.

From the foregoing it will be apparent that I have provided a breaker strip construction of novel construction in which the use of screws and nails is dispensed with and which lies parallel to the front surfaces of the cabinet. Furthermore, the construction is readily assembled, neat in appearance, and provides an efficient heat break and seal for the refrigerator cabinet.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigerator cabinet construction, the combination of inner and outer shells having heat insulation therebetween and provided with a door opening, said shells having edge portions bent inwardly toward each other and spaced apart peripherally of the door opening, a member spaced inwardly from one of said edge portions and parallel therewith forming a rigid pocket opening towards the edge portion of the other shell, a breaker strip for closing the space between the shells, said breaker strip having a side edge thereof extending into said rigid pocket, means for securing the other side edge of the breaker strip to the opposite edge portion of the other shell and independently removable metal springs disposed in the bottom of said pocket and projecting between the breaker strip and said inwardly spaced member, said springs having two resilient portions one of which exerts a force substantially at right angles to the other, one of said resilient portions contacting the edge of the breaker strip which extends into said pocket and the other of said resilient portions contacting the adjacent face of said breaker strip, to thereby urge said breaker strip sidewardly toward said securing means and crosswise toward the inner face of the edge portion of the shell which forms said pocket.

2. In refrigerator cabinet construction, the combination of inner and outer shells having heat insulation therebetween and provided with a door opening, said shells having edge portions bent inwardly toward each other and spaced apart peripherally of the door opening, a member spaced from one of said edge portions and parallel therewith forming a rigid pocket opening towards the edge portion of the other shell, a breaker strip for closing the space between the shells, said breaker strip having a side edge thereof extending into said rigid pocket, means for securing the other side edge of the breaker strip to the opposite edge portion of the other shell and independently removable metal springs disposed in the bottom of said pocket and projecting between the breaker strip and said inwardly spaced member, said springs having two resilient portions one of which exerts a force substantially at right angles to the other, one of said resilient portions contacting the edge of the breaker strip which extends into said pocket and the other of said resilient portions contacting the adjacent face of said breaker strip, to thereby urge said breaker strip sidewardly toward said securing means and crosswise toward an inner face of said pocket.

HOWARD D. WHITE.